United States Patent Office 2,858,326
Patented Oct. 28, 1958

2,858,326

PURIFICATION OF ORGANIC PEROXIDES

Clarence Elmer Ashby, Wilmington, Del., assignor to E. I. du Pont de Nemours and Company, Wilmington, Del., a corporation of Delaware No Drawing. Application April 18, 1955
Serial No. 502,217

6 Claims. (Cl. 260—453)

This invention relates to a process for the purification of organic peroxides and more particularly to the separation of hydroperoxides from organic peroxides by converting the hydroperoxides to corresponding sulfates with sulfur dioxide.

Organic peroxides are in extensive use at the present time as initiators for polymerizing monomeric compounds such, for example, as the olefins, styrenes, acrylic esters, methacrylic esters, vinyl halides, vinyl acetates, tetrafluoroethylene, acrylonitriles, butadiene/styrenes, butadiene/acrylonitriles, and the like to polymeric compounds. As would be expected the purity of the initiator determines to a large extent the quality of the polymer and, as a consequence, satisfactory methods for purifying the initiator are of prime importance.

An object of the present invention is to provide a process for the separation of hydroperoxides from organic peroxides. Another object is to effect the aforesaid object by converting hydroperoxides to corresponding sulfates and thereafter separating the sulfates from the organic peroxide. Yet another object is to reduce the hydroperoxide content of organic peroxides to permit the use of the latter in polymerization reactions whereby the initiator is controllable within narrow limits.

The above and other objects of the invention are accomplished by converting hydroperoxides, in an organic peroxide, to corresponding sulfates in accord with this equation:

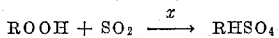

$$ROOH + SO_2 \xrightarrow{x} RHSO_4$$

in which R is an alkyl, aryl, or aralkyl group and in which $x$ is a nitrogen containing base. The base serves three important functions, it:

(1) Forms a metastable addition complex with $SO_2$, thereby reducing its vapor pressure;
(2) Initiates reaction; and
(3) Acts as acid acceptor, i. e., complexes with $RHSO_4$, assisting in forcing the reaction to completion.

The aforesaid conversion is effected in the organic peroxide which is contaminated with the hydroperoxide, a type of contamination often present in organic peroxides. The invention is directed to removing such contamination from organic peroxides such as these:

(1) Peroxides of structure ROOR (dialkyl, diaryl and alkyl aryl peroxides):
 a. Dialkyl peroxides
 b. Hexaarylethane peroxides
 c. Transannular peroxides
  Examples of which are:
   Dimethyl peroxide
   Methylethyl peroxide
   Diisopropyl peroxide
   Ditertiarybutyl peroxide
   Ethyltertbutyl peroxide
   n-Butyltertbutyl peroxide
   Tetrahydronaphthylmethyl peroxide (2) Peroxides of the structure

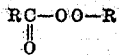

$$\underset{\underset{O}{\|}}{RC}-OO-R$$

(peresters)
 Examples of which are:
  Ethyl peracetate
  t-Butyl peracetate
  Tert-butyl perbenzoate (3) Peroxides of structure

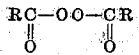

$$\underset{\underset{O}{\|}}{RC}-OO-\underset{\underset{O}{\|}}{CR}$$

(diacyl and diaroyl peroxides)
 Examples of which are:
  Dibenzoyl peroxide
  p-Monomethoxybenzoyl peroxide
  Diacetyl peroxide
  Di-n-butyryl peroxide
  Di-phenylacetyl peroxide The examples which follow are embodiments of the invention in which parts are by weight unless otherwise stated:

*Example I.*—Tertiary-butyl peracetate, 100 parts, having a hydroperoxide content as tertiary butyl hydroperoxide of about 10 percent is charged into a cooled decantation vessel provided with a stirrer of stainless steel and a side arm for the vessel. Into this vessel 44 parts of sulfur dioxide in pyridine is introduced; the solution having been prepared by cooling 28 parts of pyridine in ice and passing in 16 parts of $SO_2$. The cold pyridine $SO_2$ solution is added to the cold peracetate solution, temperature being between 10 to 5° C. or less. After 10 minutes' stirring, 25 parts of water is added to the cold solution and stirring continued for an additional 5 minutes. The water layer is then removed and washing with additional 25 parts of water repeated for about 5 times. The final wash contained 2 parts of sulfuric acid to remove last traces of pyridine. The upper layer is then subjected to distillation with reflux to a constant refractive index of 1.4032/25° C.

*Example II.*—In a process similar to that of Example I, cyclohexyl hydroperoxide can be removed from tertiary butyl 1-methylcyclohexyl peroxide whereby the hydroperoxide content of the ester is reduced to inconsequential amounts.

The hydroperoxides removed by the process of the invention have the structure ROOH, examples of which are: methyl, ethyl, isopropyl, and the higher molecular weight alkyl hydroperoxides; cyclohexyl hydroperoxides, and the like, as well as hydroperoxides of the structure

$$\underset{\underset{O}{\|}}{RC}OOH$$

examples of which are the aliphatic and aromatic peracids such as performic, peracetic, percaproic, perbenzoic acids, etc.

The organic peroxide contaminated with the hydroperoxide is converted to a sulfate in the presence and by the assistance of a base, below the decomposition temperature of the organic peroxide. Inasmuch as the organic peroxides are used principally as catalysts for their ability to produce free radicals at comparatively low temperatures, they are necessarily treated by the process of the invention and to avoid loss and decomposition at relatively low temperatures, i. e., well below their decomposition temperature and preferably below use temperatures. It is recommended that when the reaction of the invention starts, which may be determined by the temperature rise of the solution, it is regulated by cooling means to maintain the temperature of the reaction below 35° C. to 50° C. and preferably below 20° C.

Any suitable nitrogen containing base may be used instead of pyridine, such, for example, as the mono-, di-, tertiary, or other amines; e. g., dimethylamines, aliphatic tertiary amines, quinoline, the picolines, morpholines, and triethanolamines. The amount of sulfur dioxide used is not critical although the stoichiometrical requirements of the reaction should be satisfied. The sulfur dioxide is passed into the base prior to the reaction until the base is substantially saturated with the gas at about the temperature of the reaction. Since the sulfur dioxide is used in about stoichiometric quantities, sufficient base containing the sulfur dioxide is added to supply that amount of the reactant.

Water is the preferred extractant of the sulfate from the organic peroxide but other extractants may be used for accomplishing the separation such, for example, as a solvent for the sulfate, other than water, and a nonsolvent for the organic peroxide or vice-versa; crystallization may be effective as well as distillation under reduced pressure when a stable organic peroxide is being purified.

I claim:

1. In a process for the purification of organic peroxides by the separation therefrom of hydroperoxides, the steps which comprise converting hydroperoxides to corresponding sulfates in accord with the reaction:

$$ROOH + SO_2 \xrightarrow{X} RHSO_4$$

in which R is a hydrocarbon group containing from 1 to 11 carbon atoms and X is a nitrogen-containing base, conducting the conversion in an organic peroxide of the group consisting of those having the formulas:

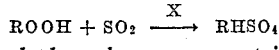

and

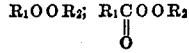

in which $R_1$ and $R_2$ are hydrocarbon groups containing 1 to 11 carbon atoms, and thereafter removing the $RHSO_4$ from the organic peroxide.

2. The process of claim 1 in which X is pyridine.

3. In a process for the purification of tertiary butyl peracetate by the separation of tertiary butyl hydroperoxide therefrom, the steps which comprise converting the tertiary butyl hydroperoxide to its corresponding sulfate by reaction with $SO_2$ in the presence of a nitrogen-containing base, and thereafter removing from the tertiary butyl peracetate the sulfate derivative of the tertiary butyl hydroperoxide.

4. The process of claim 3 in which the nitrogen-containing base in pyridine.

5. In a process for the purification of tertiary butyl 1-methylcyclohexyl peroxide as an initiator for polymerizing monomeric compounds, the steps which comprise treating, at a temperature below 50° C., a tertiary butyl 1-methylcyclohexyl peroxide containing 1-cyclohexyl hydroperoxide, by forming a sulfate of the hydroperoxide by reaction with sulfur dioxide and a nitrogen-containing base, and thereafter removing the sulfate formed from the tertiary butyl 1-methylcyclohexyl peroxide.

6. The process of claim 5 in which the nitrogen-containing base is pyridine.

References Cited in the file of this patent

UNITED STATES PATENTS 2,645,656     Oldham et al. _____ July 14, 1953